US008875219B2

(12) United States Patent
Wilson

(10) Patent No.: US 8,875,219 B2
(45) Date of Patent: Oct. 28, 2014

(54) APPARATUS AND METHOD FOR CONTROLLED SHARING OF PERSONAL INFORMATION

(75) Inventor: Nicholas Bryson Wilson, Kanata (CA)

(73) Assignee: BlackBerry Limited, Waterloo (CA)

( * ) Notice: Subject to any disclaimer, the term of this patent is extended or adjusted under 35 U.S.C. 154(b) by 1284 days.

(21) Appl. No.: 12/512,316

(22) Filed: Jul. 30, 2009

(65) Prior Publication Data

US 2011/0030067 A1    Feb. 3, 2011

(51) Int. Cl.
G06F 17/00 (2006.01)
H04L 9/32 (2006.01)
G06F 21/62 (2013.01)

(52) U.S. Cl.
CPC .................................. *G06F 21/6245* (2013.01)
USPC ............................................. 726/1; 713/168

(58) Field of Classification Search
CPC .................................................... G06F 21/6245
USPC ........... 726/1, 6, 23, 26, 27; 713/168; 715/33, 715/778, 772; 712/36
See application file for complete search history.

(56) References Cited

U.S. PATENT DOCUMENTS

| | | | |
|---|---|---|---|
| 5,805,886 A | 9/1998 | Skarbo et al. | |
| 6,393,568 B1 * | 5/2002 | Ranger et al. | 713/188 |
| 6,751,731 B1 * | 6/2004 | Binding et al. | 713/171 |
| 6,851,053 B1 * | 2/2005 | Liles et al. | 713/168 |
| 6,990,513 B2 * | 1/2006 | Belfiore et al. | 709/203 |
| 7,131,138 B2 * | 10/2006 | Ikeda | 726/3 |
| 7,181,500 B2 * | 2/2007 | Jen et al. | 709/217 |

(Continued)

FOREIGN PATENT DOCUMENTS

WO    WO 01/50299 A2    7/2001
WO    WO 2007/066862 A1    6/2007

OTHER PUBLICATIONS

Hakkila, J.; "Privacy and Information Sharing in Future Mobile Computing"; IADIS International Conference Applied Computing, Mar. 23$^{rd}$ to 26$^{th}$, 2004; www.iadis.et/dl/final_uploads/200401L039.pdf.

(Continued)

*Primary Examiner* — Abu Sholeman
(74) *Attorney, Agent, or Firm* — Brett J. Slaney; Blake, Cassels & Graydon LLP

(57) ABSTRACT

An apparatus and method for controlled sharing of personal information are provided which allow confident and accurate indications of, and alterations to, the level of personal information being shared by all personal information sharing capable (i.e. source) applications of a portable electronic device. Controlled personal information sharing is achieved through the application of sharing modes which are enabled through the cooperation of a plurality of applications which share personal information, a detecting module which detects requests to control the continued sharing of personal information and a controlling module controls the continued sharing of personal information by the plurality of applications. A universal sharing toggle is provided which allows a user of a portable electronic device to control the sharing of all personal information by the device. A personal information sharing icon is provided which gives a user of a portable electronic device a quick indication of the present state of the device's sharing mode. In cooperation, the universal sharing toggle and personal information sharing icon provide a user of a portable electronic device with a highly useable and efficient mechanism to control the amount of privacy provided by the device by restricting or allowing personal information to be shared.

29 Claims, 12 Drawing Sheets

(56) References Cited

U.S. PATENT DOCUMENTS

| | | | |
|---|---|---|---|
| 7,263,551 B2* | 8/2007 | Belfiore et al. | 709/219 |
| 7,284,055 B1* | 10/2007 | Oehrke et al. | 709/226 |
| 7,342,906 B1* | 3/2008 | Calhoun | 370/338 |
| 7,571,465 B2* | 8/2009 | Ikeda | 726/3 |
| 7,685,598 B1* | 3/2010 | Badenell et al. | 718/104 |
| 7,730,528 B2* | 6/2010 | Chun et al. | 726/12 |
| 7,954,138 B2* | 5/2011 | LiVecchi et al. | 726/4 |
| 7,999,840 B2* | 8/2011 | Kim et al. | 348/14.02 |
| 8,036,632 B1* | 10/2011 | Cona et al. | 455/404.1 |
| 8,533,723 B1* | 9/2013 | Badenell et al. | 718/104 |
| 8,621,483 B2* | 12/2013 | Park | 719/311 |
| 8,656,161 B2* | 2/2014 | Nakae | 713/168 |
| 8,732,816 B2* | 5/2014 | Sugimoto et al. | 726/12 |
| 8,745,372 B2* | 6/2014 | Orsini et al. | 713/151 |
| 8,745,379 B2* | 6/2014 | Orsini et al. | 713/157 |
| 2002/0144152 A1* | 10/2002 | Ikeda | 713/201 |
| 2002/0147645 A1* | 10/2002 | Alao et al. | 705/14 |
| 2002/0184527 A1* | 12/2002 | Chun et al. | 713/201 |
| 2002/0194389 A1* | 12/2002 | Worley et al. | 709/310 |
| 2004/0177359 A1* | 9/2004 | Bauch et al. | 719/313 |
| 2006/0230124 A1* | 10/2006 | Belfiore et al. | 709/219 |
| 2007/0022305 A1* | 1/2007 | Ikeda | 713/189 |
| 2007/0115346 A1* | 5/2007 | Kim et al. | 348/14.02 |
| 2007/0139372 A1* | 6/2007 | Swanburg et al. | 345/156 |
| 2007/0143398 A1* | 6/2007 | Graham | 709/204 |
| 2007/0156951 A1* | 7/2007 | Sultan et al. | 711/103 |
| 2007/0250903 A1 | 10/2007 | Furuichi et al. | |
| 2008/0014968 A1* | 1/2008 | Yoon | 455/456.5 |
| 2008/0022376 A1* | 1/2008 | Ke et al. | 726/5 |
| 2008/0132252 A1* | 6/2008 | Altman et al. | 455/457 |
| 2008/0148354 A1 | 6/2008 | D'Aviera | |
| 2008/0155644 A1* | 6/2008 | Baranov et al. | 726/1 |
| 2008/0216089 A1* | 9/2008 | Jia et al. | 719/312 |
| 2009/0006566 A1* | 1/2009 | Veeramachaneni et al. | 709/206 |
| 2009/0037929 A1* | 2/2009 | Shimko et al. | 719/312 |
| 2009/0047972 A1* | 2/2009 | Neeraj | 455/456.1 |
| 2009/0181653 A1* | 7/2009 | Alharayeri | 455/414.1 |
| 2009/0254993 A1* | 10/2009 | Leone | 726/25 |
| 2009/0292595 A1* | 11/2009 | Tonnison et al. | 705/11 |
| 2009/0313467 A1* | 12/2009 | Atkins et al. | 713/155 |
| 2010/0030734 A1* | 2/2010 | Chunilal | 707/3 |
| 2010/0185876 A1* | 7/2010 | Kim | 713/190 |
| 2010/0235881 A1* | 9/2010 | Liu et al. | 726/3 |
| 2010/0257374 A1* | 10/2010 | Kuehn et al. | 713/189 |
| 2010/0257588 A1* | 10/2010 | Urien | 726/3 |
| 2010/0299615 A1* | 11/2010 | Miluzzo et al. | 715/752 |
| 2011/0004665 A1* | 1/2011 | Kim et al. | 709/206 |
| 2011/0039494 A1* | 2/2011 | Shon et al. | 455/41.1 |
| 2011/0099384 A1* | 4/2011 | Grange et al. | 713/184 |
| 2011/0123972 A1* | 5/2011 | Friedman | 434/308 |
| 2011/0125228 A1* | 5/2011 | Lytle et al. | 607/89 |
| 2011/0138289 A1* | 6/2011 | Koren | 715/733 |
| 2011/0145727 A1* | 6/2011 | Koren | 715/752 |
| 2011/0179473 A1* | 7/2011 | Lee et al. | 726/6 |
| 2011/0258326 A1* | 10/2011 | Hu et al. | 709/226 |
| 2011/0276798 A1* | 11/2011 | Liang et al. | 713/156 |
| 2011/0296401 A1* | 12/2011 | DePoy | 717/174 |
| 2011/0296440 A1* | 12/2011 | Laurich et al. | 719/326 |
| 2011/0307599 A1* | 12/2011 | Saretto et al. | 709/224 |
| 2012/0036360 A1* | 2/2012 | Bassu et al. | 713/168 |
| 2012/0062758 A1* | 3/2012 | Devine et al. | 348/222.1 |
| 2012/0166997 A1* | 6/2012 | Cho et al. | 715/778 |
| 2012/0184370 A1* | 7/2012 | Goller et al. | 463/36 |
| 2012/0324482 A1* | 12/2012 | Park | 719/328 |
| 2013/0052982 A1* | 2/2013 | Rohde et al. | 455/404.1 |
| 2013/0055378 A1* | 2/2013 | Chang et al. | 726/17 |
| 2013/0091416 A1* | 4/2013 | Villoslada De La Torre et al. | 715/234 |
| 2013/0167045 A1* | 6/2013 | Xu et al. | 715/760 |
| 2013/0179954 A1* | 7/2013 | Bidare | 726/7 |
| 2013/0182838 A1* | 7/2013 | Kelley et al. | 380/44 |
| 2013/0185356 A1* | 7/2013 | Mizutani et al. | 709/204 |
| 2013/0197933 A1* | 8/2013 | Whitlow et al. | 705/3 |
| 2013/0238356 A1* | 9/2013 | Torii et al. | 705/2 |
| 2013/0254041 A1* | 9/2013 | Sherwin et al. | 705/14.68 |
| 2013/0254108 A1* | 9/2013 | Royyuru | 705/42 |
| 2013/0268760 A1* | 10/2013 | Bono et al. | 713/168 |
| 2013/0273879 A1* | 10/2013 | Eisen et al. | 455/405 |
| 2013/0275768 A1* | 10/2013 | Orsini et al. | 713/189 |
| 2013/0276134 A1* | 10/2013 | Meredith et al. | 726/27 |
| 2013/0283065 A1* | 10/2013 | Orsini et al. | 713/193 |
| 2013/0295907 A1* | 11/2013 | Sakano | 455/418 |
| 2013/0303143 A1* | 11/2013 | Schrader et al. | 455/418 |
| 2013/0305354 A1* | 11/2013 | King et al. | 726/19 |
| 2013/0312059 A1* | 11/2013 | Otsuki et al. | 726/1 |
| 2014/0020043 A1* | 1/2014 | Anand et al. | 726/1 |
| 2014/0047194 A1* | 2/2014 | Doi | 711/144 |
| 2014/0068755 A1* | 3/2014 | King et al. | 726/19 |
| 2014/0089437 A1* | 3/2014 | Audebert et al. | 709/206 |
| 2014/0095682 A1* | 4/2014 | Yablokov | 709/223 |
| 2014/0101568 A1* | 4/2014 | Skyrm et al. | 715/752 |
| 2014/0108807 A1* | 4/2014 | Orsini et al. | 713/171 |
| 2014/0109174 A1* | 4/2014 | Barton et al. | 726/1 |
| 2014/0109175 A1* | 4/2014 | Barton et al. | 726/1 |
| 2014/0114943 A1* | 4/2014 | Holenweger et al. | 707/706 |
| 2014/0123320 A1* | 5/2014 | Isozaki et al. | 726/29 |
| 2014/0128032 A1* | 5/2014 | Muthukumar | 455/411 |
| 2014/0150056 A1* | 5/2014 | Williams et al. | 726/2 |
| 2014/0150077 A1* | 5/2014 | Roy et al. | 726/7 |

OTHER PUBLICATIONS

"Exposing Applications in Use by Members of an Instant Messenger Buddy List"; ip.com Journal; Sep. 20, 2006; ip.com Inc.; West Henrietta; New York; U.S.

Jascau, Adrian; Search Report from corresponding European Application No. 09166868.1; search completed Jan. 28, 2010.

* cited by examiner

APPARATUS AND METHOD FOR CONTROLLED SHARING OF PERSONAL INFORMATION

FIELD OF THE TECHNOLOGY

The present disclosure relates generally to the field of electronic communications and particularly to an apparatus and method for controlling the dissemination of personal information.

BACKGROUND

Portable electronic devices have become a near ubiquitous aspect of everyday modern living. Many people carry a portable electronic device (such as a cellular telephone, personal digital assistant, smartphone, netbook or laptop) with them everywhere they go. These portable electronic devices are often capable of communicating information to other electronic devices using common network communications technologies, such as wireless communications networks and wired communications networks.

Some portable electronic devices share information about the user of the portable electronic device to easily inform other people about the user's current activities. This information may be referred to generally as presence information, or personal information. Some users are increasingly happy to share intimate details of their daily lives with anyone who is interested. These users expect that their portable electronic device will share personal information, often without their ongoing permission or specific instruction.

There may be times when the user of a portable electronic device desires privacy while still being able to use the portable electronic device for other purposes. Current portable electronic devices do not offer a useful, reliable and simple mechanism to achieve a desired level of privacy.

BRIEF DESCRIPTION OF THE DRAWINGS

The accompanying drawings illustrate embodiments of apparatus and methods for controlled sharing of personal information by way of example only. In the drawings.

DETAILED DESCRIPTION OF SAMPLE EMBODIMENTS

Figure 1:
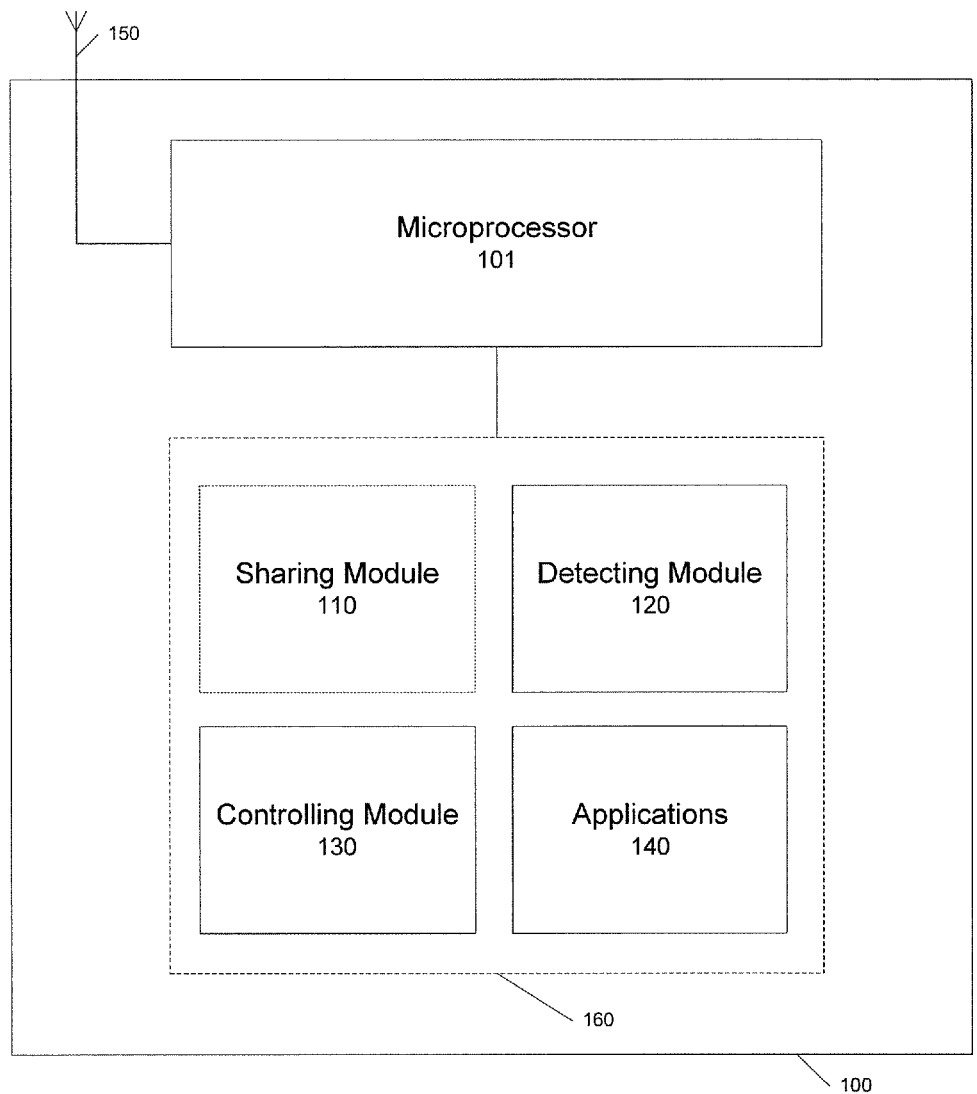
FIG. 1 shows selected components of an exemplary portable electronic device for controlled sharing of personal information.

Portable electronic devices are being used for increasingly sophisticated and varied purposes. Portable electronic devices are typically capable of executing a number of applications which provide a variety of functionality to a user of the portable electronic device. Some applications are configured to share (or publish) contextual information about the device and what is happening at, or to, the device to interested parties. Information about what is happening at the device or to the device can be correlated into information about a user of the device. This information can generally be referred to as personal information because of its association with the user of the portable electronic device and is often referred to as presence information. To share personal information, the portable electronic device communicates the personal information to another electronic device, typically using network communication technologies.

There are many different types of applications which share many different types of personal information. One example application is a location application which shares personal information indicating the geographic location of the portable electronic device. Another example application is a social networking application which shares the current status of the user of the device, such as 'in a meeting', 'on the phone' or 'having a tough day'. Yet another example application is a messaging application which shares information about what the user of the device is doing with the portable electronic device, such as 'listening to Landslide by Fleetwood Mac' or 'typing a message'. The variety of personal information shared by a portable electronic device is ever increasing. Creative software application developers continue to create ever more useful and varied types of personal information which can be shared from a portable electronic device.

Some presence information is generated directly by a user, such as a user changing their 'status' from Busy to Available, while other presence information is generated without direct interaction by a user. Presence information which is generated without direct user interaction includes periodic updates generated automatically at the portable electronic device which describe particular states. Particular states include where a portable electronic device is, if a calendar application of a portable electronic device indicates that a user of the portable electronic device is entering or exiting a meeting, or whether or not the user is presently typing a message using the portable electronic device.

Current portable electronic devices rely on individual applications to share or not share personal information according to their own instructions, largely independent of other applications on the portable electronic device. For example, each application allows a user to turn off personal information sharing for the specific application. To reliably achieve a high level of privacy, a user of the portable electronic device has to access each of the individual applications to ensure that personal information sharing functionality is turned off. Such a system requires a user to exert unnecessary effort to access multiple individual applications to ensure that personal information sharing is turned off in each of the applications. In addition, such a system does not provide the user with a clear and reliable indication that no personal information is being shared after the user has accessed each of the applications to turn off the personal information sharing of each application. It is possible that the user did not access one application which is still sharing personal information, possibly due to inadvertence or a lack of understanding on the part of the user. It is further possible that the user is unaware that a particular application is sharing personal information.

Controlled sharing of personal information is achieved by an apparatus and method whereby a portable electronic device is capable of having a plurality of applications each independently sharing personal information, detecting a request to alter the level at which personal information is shared and altering the level at which the plurality of applications are able to continue sharing personal information. An easily seen indicator is maintained in accordance with the level at which personal information is shared to provide a user of the portable electronic device a quick assessment of whether or not personal information is being shared.

Personal information derived from, generated by or associated with a plurality of applications of a portable electronic device is shared by the portable electronic device with other electronic devices. Each of the plurality of applications of the personal electronic device is capable of sharing personal information according to the functionality of the specific application. For example, a location or mapping application shares personal information relevant to location, a social networking application shares personal information relevant to social networking and a messaging application shares personal information relevant to messaging. Each application executes independent of other applications of the portable electronic device and shares personal information according to pre-configured instructions.

Some of these applications share personal information generated by the application itself and other applications derive the information they share from other applications or data stores. For example, a social networking application shares personal information about a user's interactions with the social networking application itself (such as an indication of 'I do not want to be disturbed') and the social networking application also shares personal information derived from a separate calendar application's data store (such as 'In a meeting').

A portable electronic device is capable of operating in a number of different personal information sharing modes ("sharing modes"), ranging from full sharing mode to full privacy mode. In full sharing mode all applications of the portable electronic device share personal information without restriction. In full privacy mode, the applications of the portable electronic device are completely restricted from sharing personal information. Between full sharing mode and full privacy mode there exist sharing modes where certain types, quantities or classes of personal information are or are not shared by certain applications of the portable electronic device. Sharing modes can be described as ranging from a high level of sharing, to a low, or a zero level of sharing. Each sharing mode corresponds to a given level of personal information being shared by the applications of the portable electronic device To simplify the task of alternating between the various sharing modes, a sharing toggle is provided. The sharing toggle provides a single point of access from which a user of the portable device can alter the sharing mode across all applications of the device. The sharing toggle operates to detect a request to restrict or allow the sharing of personal information. Detection typically occurs by a user of the portable electronic device actuating a user interface of the portable electronic device according to a pre-defined set of instructions.

Further embodiments reduce uncertainty which a user of a portable electronic device may have regarding whether or not applications of the portable electronic device are sharing personal information by including a sharing indicator which provides an easily referenced indication to a user of the portable electronic device of whether personal information is presently being shared by the applications of the portable electronic device. The sharing indicator operates in conjunction with the sharing toggle to inform the user of the current sharing mode of the device and provides an indication to the user of the current level of personal information being shared by the portable electronic device with other electronic devices.

A sharing toggle and sharing indicator permit a user of a portable electronic device to control a desired level of personal information sharing, and, by association, a desired level of privacy. The sharing toggle allows a user to alter the ability of multiple applications to share personal information from a single access point, reducing the burden and uncertainty imposed on a user in previous systems. The sharing indicator, in cooperation with the sharing toggle, provides the user with an easy to see indication of the present level of privacy afforded by the device and provides a simple and reliable indicator to the user upon which the user may make a decision about if they are satisfied with the level of privacy or if a change needs to be made via the sharing toggle.

Embodiments of an apparatus for controlled sharing of personal information are provided, the apparatus comprising a plurality of applications adapted to share personal information, a detecting module adapted to detect a request to alter the personal information sharing of the plurality of applications and a controlling module adapted to alter the plurality of applications' sharing of personal information in accordance with the request detected by the detecting module.

Further embodiments are provided wherein the altering comprises restricting a level of personal information being shared by the plurality of applications, wherein the apparatus comprises an indicator which indicates the level of personal information being shared by the plurality of applications, wherein the apparatus further comprises a homescreen and the indicator is displayed as part of the homescreen, and wherein the apparatus further comprises a status bar wherein the indicator is displayed as part of the status bar.

Another embodiment is provided having a method for controlled sharing of personal information comprising sharing a level of personal information from a plurality of applications, detecting a request to alter the level of personal information sharing from the plurality of applications and controlling the level of personal information being shared by the plurality of applications according to the detected request.

Further embodiments of the method are provided wherein the controlling comprises filtering or not filtering requests to share personal information received according to an Application Programming Interface, wherein the controlling comprises notifying the plurality of applications of the detected request and the plurality of applications sharing personal information according to the requested level of sharing of personal information, wherein the controlling comprises registering or authorizing the plurality of applications to ensure that the plurality of applications share personal information according to the requested level of sharing of personal information, wherein the controlling further comprises identifying suspect applications and inspecting requests to share personal information originating from the suspect applications, wherein the sharing, detecting and controlling occur at a portable electronic device, and wherein the sharing, detecting and controlling occur at a server.

Another embodiment is provided wherein a second exemplary apparatus for controlled sharing of personal information comprises a personal information sharing status indicator and a plurality of applications sharing personal information according to a sharing mode, wherein the personal information sharing status indicator provides a visual indication of the sharing mode.

Further embodiments of the second exemplary apparatus are provided wherein the personal information sharing status indicator is an icon and upon an actuation of the icon a graphical representation of a sharing toggle is presented, wherein the sharing toggle comprises a universal sharing toggle and an individual sharing toggle, wherein the sharing toggle further comprises an additional access point, and wherein the personal information sharing status indicator comprises an alerting visual indication which indicates that there is a potential that an undesired level of personal information may be being shared by the plurality of applications.

Embodiment of a sharing toggle are also provided, the sharing toggle comprising a universal sharing toggle for altering the level of personal information sharing of a plurality of applications and an individual sharing toggle for altering the level of personal information sharing of a single application.

Embodiments of the sharing toggle embodied in a computer readable medium comprising instructions for executing a sharing toggle are also provided.

Embodiments of a portable electronic device are provided, the portable electronic device comprising a housing, the housing housing a display, a keyboard, a navigation device, a communication mechanism, a storage mechanism, and a processor for coordinating the operation of the display, the keyboard, the navigation device, the communication mechanism and the storage mechanism, the portable electronic device also comprises a plurality of applications stored in the storage mechanism and executable by the processor to share personal information, a detecting module stored in the storage mechanism and executable by the processor, and a controlling module stored in the storage mechanism, the controlling module executable by the processor.

Sample embodiments are now described in greater detail with reference to the Figures.

Turning to FIG. 1, an exemplary portable electronic device 100 is shown. The depiction of portable electronic device 100 includes components that are pertinent to an understanding of controlled sharing of personal information. A person skilled in the art of mobile computing will understand that other components are further included in portable electronic device 100. Some of these many other components are shown in the subsequent figures.

Portable electronic device has a control processor, such as microprocessor 101, which is responsible for coordinating and executing the various functions of the portable electronic device. Microprocessor 101 controls the overall functioning of portable electronic device 100 as is well known in the art.

Portable electronic device 100 has a communication mechanism 150 which is capable of communicating with other electronic devices. Communication mechanism 150 includes mechanisms capable of communicating with other electronic devices over a communication medium and may comprise an antenna, a modem, a transport stack and the like. Example communication media include wireless media such as cellular, WiFi, or Bluetooth systems, or wired media such as Ethernet, or both wired and wireless media. Communication mechanism 150 is capable of sending and receiving information according to one or more of a variety of communication protocols under the direction of microprocessor 101. Portable electronic device 100 shares personal information with other electronic devices by sending signals of encoded information which convey the personal information in a manner that can be decoded by the other electronic device. Methods and mechanisms for such communications are well known in the art and are described in further detail below in relation to FIG. 1a.

Portable electronic device 100 has a storage mechanism 160 which is capable of storing data, such as applications and application data. Applications include computer readable instructions which can be read and executed by microprocessor 101. In some embodiments storage mechanism 160 is non-volatile memory, volatile memory, or both.

Portable electronic device 100 comprises applications 140 which can be read and executed by microprocessor 101 at portable electronic device 100 to provide desired functionality to a user of portable electronic device 100. Applications 140 are, for example, software or firmware, or both, which are executable at portable electronic device 100 in cooperation with a controlled sharing of personal information. Applications 140 can include a location application capable of displaying maps, routing information, current location information and the like. Applications 140 can further include a social networking application which allows a user to network, communicate and stay connected with a group of other people. Applications 140 can further include a messaging application which allows a user to send and receive messages, such as email, SMS and instant messages. Applications 140 includes any application capable of sharing personal information via communication mechanism 150 and can be referred to generally and collectively as source applications because they are a source of personal information to be shared.

Portable electronic device 100 further comprises modules which can be read and executed by microprocessor 101 to enable controlled sharing of personal information. Detecting module 120 and controlling module 130, which may be embodied in a single module or separately, assist in the controlled sharing of personal information being done by applications 140. Detecting module 120 and controlling module 130 are, for example, software or firmware, or both, and are executed at portable electronic device 100 to provide controlled sharing of personal information.

In some embodiments, storage mechanism 160 stores detecting module 120, controlling module 130 and applications 140. In other embodiments, one or more of detecting module 120, controlling module 130 and applications 140 are stored remote from portable electronic device 100. In such other embodiments, detecting module 120, controlling module 130 and applications 140 are resident on, for example, a server (such as server 183 of FIG. 1a) and are sent to portable electronic device 100 for on demand execution.

Applications 140 share personal information with other electronic devices, typically for further dissemination or use by related applications on the other electronic devices. Each one of the applications 140 is typically responsible for monitoring, gathering, generating and sending personal information relevant to the respective one of the applications 140. Applications 140 determine that new personal information is to be shared, and the personal information is passed on to communication mechanism 150 formatted as appropriate messages for transmission to the other electronic devices.

Applications 140 may alternatively share personal information using a sharing module 110. In embodiments having a sharing module 110, applications 140 rely on sharing module 110 to coordinate and implement the overall sharing of personal information shared by applications 140. Portable electronic device 100 can alternatively comprise multiple sharing modules 110 which are each associated with a particular application of applications 140. Sharing module(s) 110 may be integral to one or more of the applications 140.

Each one of applications 140 is responsible for identifying, generating and formatting personal information to be sent to other electronic devices via communication mechanism 150. Using a location application as an example of one of applications 140, the location application is, among other things, configured to monitor the geographic location of portable electronic device 100 and to identify that a predetermined threshold of change in the geographic location of portable electronic device 100 has been exceeded. Upon identifying the change in geographic location, the location application retrieves a current geographic location, generates and formats an encoded information message indicative of the new geographic location and sends the encoded personal information message to other electronic devices via communication mechanism 150. Similar procedures are used by each of applications 140 to share relevant personal information as is well known in the art.

Detecting module 120 detects requests to alter the sharing mode of portable electronic device 100. To detect requests, detecting module 120 detects user input received via user input devices (such as a keyboard or navigation device) from a user of portable electronic device 100. Detecting module 120 is easily accessible to a user of portable electronic device 100 and can include a physical switch or a computer generated representation of a switch, accessed by the user using user interface devices of portable electronic device 100. In embodiments having a computer generated representation of a switch, the switch may be integral to one or more of applications 140 or may be accessible apart from any of applications 140, such as, for example, where the detecting module 120 is accessible from a homescreen of portable electronic device 100.

Detecting module 120 is responsible for identifying a request to alter the current sharing mode of portable electronic device 100. For example, detecting module 120 identifies a request by receiving a signal that a particular button of portable electronic device 100 has been pressed, or that a particular pattern of button presses has occurred. Detecting module 120 can be configured to monitor input signals received by portable electronic device 100, or detecting module 120 can be informed of requests by another component of portable electronic device 100. For example, detecting module 120 is configured to identify when a user of portable electronic device 100 presses an assigned key, such as a convenience key, to indicate a desire to alter the sharing mode. Alternatively, detecting module 120 is configured to display a user interface element, such as an icon or a menu item, on a display of portable electronic device 100 which can be accessed by a user through a combination of directional navigation and actuation actions. In such an alternative embodiment, detecting module 120 is configured to detect when a user has actuated the user interface element in a manner which indicates a desire to alter the sharing mode. Specific embodiments are discussed below in relation to FIGS. 3, 6, 7 and 8.

Controlling module 130 receives an indication from detecting module 120 that a change to the sharing mode of portable electronic device 100 has been requested. Upon receipt of such an indication, controlling module 130 determines what action has been requested, such requests include restricting or increasing the level of personal information being shared from portable electronic device 100 by applications 140. In a situation where the request indicates that a restricted level of personal information sharing has been requested, controlling module 130 alters the current level of personal information sharing by throttling the ability of applications 140 to share personal information. Such throttling can limit which types or classes of personal information are shared, or the throttling can be a complete cessation of sharing of personal information from portable electronic device 100. In a situation where the request indicates that an increased level of personal information sharing has been requested, controlling module 130 expands the ability of applications 140 to share personal information. Such an expansion can increase the types or classes of personal information which are shared, or the expansion can be a complete grant of permission for applications 140 to share any and all personal information.

Controlling module 130 is responsible for establishing and enforcing a desired sharing mode (and a corresponding level of personal information sharing). Controlling module 130 is configured to forcibly restrict the ability of applications 140 to share personal information from portable electronic device 100. Forcible restriction includes, for example, intercepting or blocking personal information sharing messages and sending a message to applications 140 (or sharing module 100 in certain embodiments) to indicate the permitted level of personal information sharing.

Figure 1A:
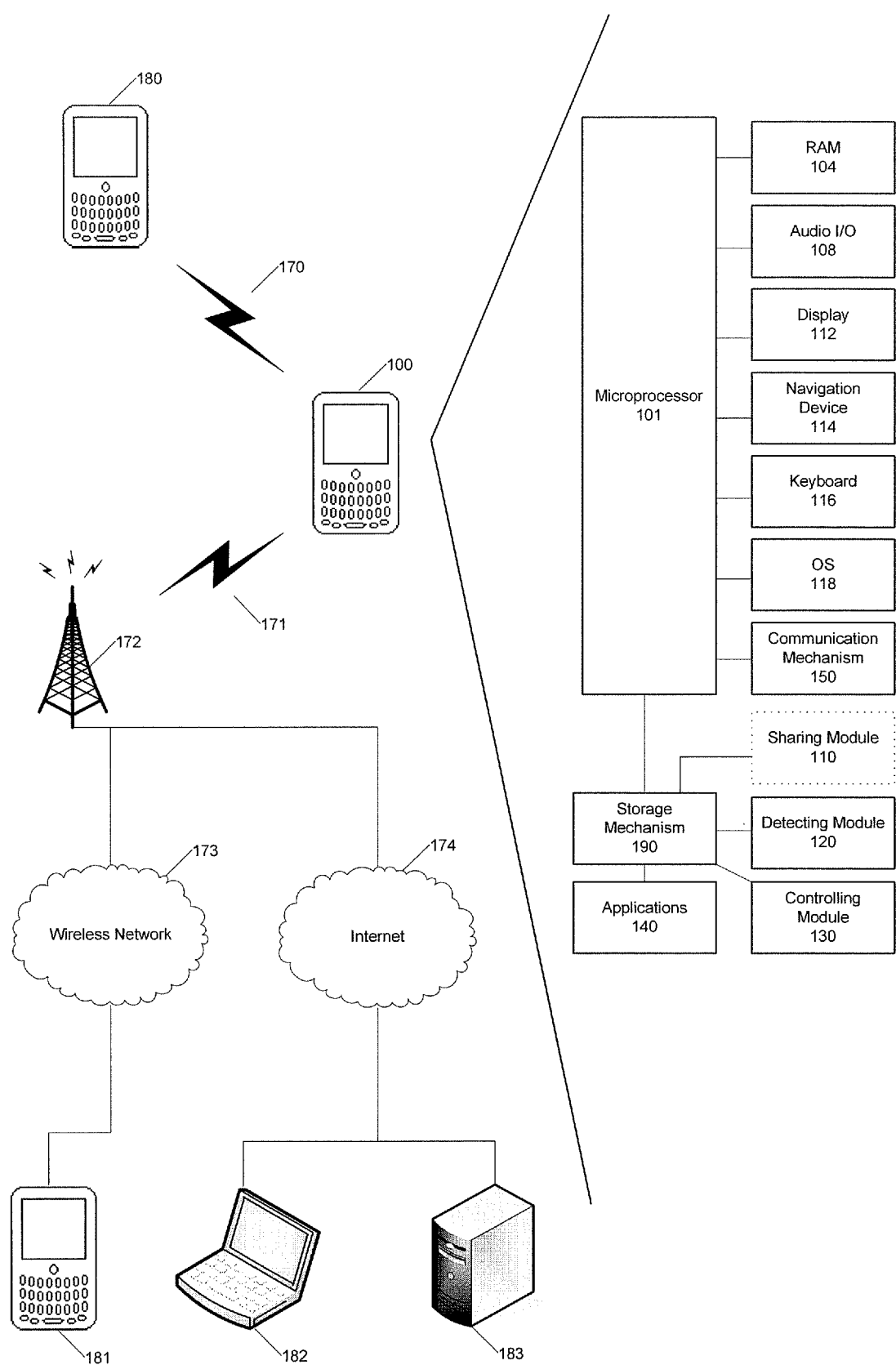
FIG. 1a shows a networked communications environment with an exemplary portable electronic device for controlled sharing of personal information operating therein.

Further details of portable electronic device 100 and a system for the controlled sharing of personal information are described in FIG. 1a. In FIG. 1a portable electronic device 100 comprises microprocessor 101, RAM 104, audio input/output 108, display 112, navigation device 114, keyboard 116, operating system 118, communication mechanism 150 and storage mechanism 190 which comprises sharing module 110, detecting module 120, controlling module 130 and applications 140.

RAM 104 is, for example, random access memory which is volatile memory commonly used by microprocessor 101 to store short term data for the operation of portable electronic device 100. Audio input/output 108 comprise, for example, a speaker and a microphone which are capable of receiving, coding, decoding and emitting sounds. Display 112 is, for example a liquid crystal display or touch-sensitive screen, capable of displaying information at the direction of microprocessor 101, and in the case of a touch-sensitive display, display 112 is capable of capturing input according to touches of the display 112. Navigation device 115 is, for example, a trackball or trackpad capable of receiving, interpreting, processing and relaying detected input along one or more axes to permit directional navigation of elements displayed on display 112. Navigation device 114 is also capable of detecting actuations when, for example, navigation device 114 is clicked, or pushed in. Keyboard 116 is, for example, a set of physical keys or computer generated keys on display 112, with alphabetic and numeric, or both, integers associated therewith. Keyboard 116 is, for example, a QWERTY keyboard, a T-9 keyboard, a reduced keyboard and the like. Operating system 118 is, for example, a set of software modules which, when executed by microprocessor 101, enable and coordinate the overall operation of portable electronic device 100 as is well known. Operating system 118 is typically stored as part of storage mechanism 190.

Also shown in FIG. 1a are a number of other electronic devices which can communicate with portable electronic device 100.

Portable electronic device 180 is similar to portable electronic device 100 and is shown in FIG. 1a communicating with portable electronic device 100 over short range wireless communications 170 which are carried out using a protocol, such as Bluetooth® or Zigbee®. Applications 140 of portable electronic device 100 share personal information with complementary applications of portable electronic device 180 directly over short range wireless communications 170.

Portable electronic device 181 is similar to portable electronic device 100 and is shown in FIG. 1a communicating with portable electronic device 100 via basestation 172 and wireless network 173. Applications 140 of portable electronic device 100 share personal information with complementary applications embodied at portable electronic device 181 by sending messages using commonly known long range wireless communications protocols, such as cellular wireless communications 171.

Electronic device 182 is, for example, a laptop computer connected to the internet via, for example, an Ethernet or WiFi communication mechanism. Electronic device 182 has applications, such as a location application, which operate to receive personal information sent from portable electronic device 100 over cellular wireless communications 171, via basestation 172 and internet 174 (and possibly server 183). Electronic device 182 is also capable of sending personal information back to portable electronic device 100.

Server 183 is, for example, a personal information sharing server, such as an instant messaging server or a social networking server, which operates to coordinate and facilitate the sharing of personal information amongst a large number of disparate electronic devices. Server 183 is configured to receive personal information sent from portable electronic device 100 over cellular wireless communications 171, via basestation 172 and internet 174. Server 183 is configured to use or re-send the personal information to other interested parties, such as electronic devices being used by the 'buddies' of the user of portable electronic device 100. Server 183 uses and re-sends personal information using well known personal information sharing mechanisms.

As described above in relation to FIG. 1, portable electronic device 100 comprises applications 140 which share personal information, and controlling module 130 which is responsible for establishing and enforcing a desired sharing mode detected by detecting module 120. There are a number of methods by which controlling module 130 controls the level of personal information being shared.

Figure 1B:
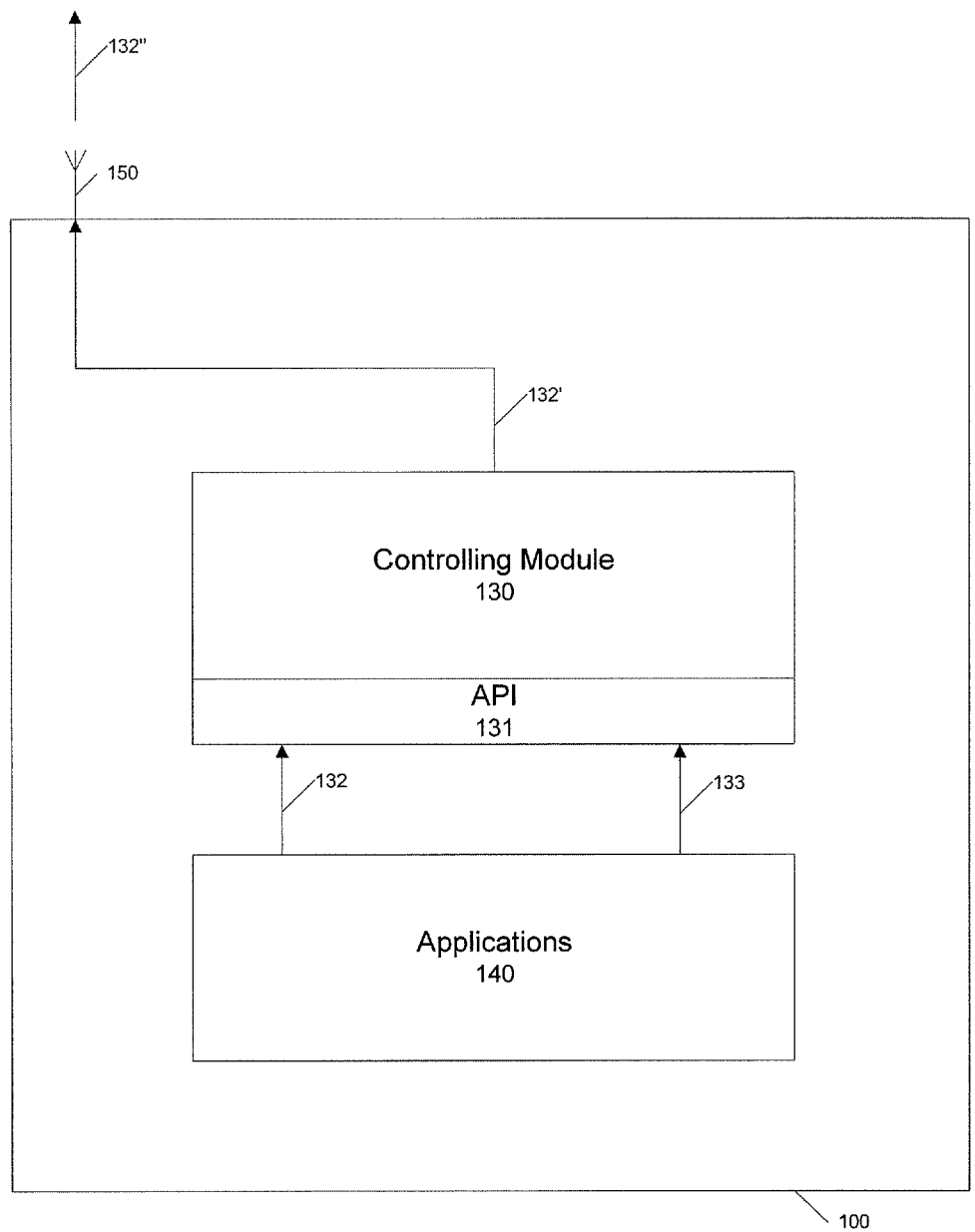
FIG. 1b shows another exemplary portable electronic device for controlled sharing of personal information.

In a first exemplary method, shown in FIG. 1b, controlling module 130 operates in cooperation with Application Programming Interface (API) 131 to receive and execute requests from applications 140 to share personal information. According to such an exemplary method, applications 140 are not by themselves capable of sharing personal information. In order to share personal information applications 140 must send a request, or message, to controlling module 130 pursuant to API 131. Upon receipt of a request, controlling module 130 operates to filter or not filter requests, by either suppressing or transmitting received requests, according to the current sharing mode. For example, if the current sharing mode is set to a full privacy mode, controlling module 130 filters all received requests to share personal information, ensuring that applications 140 are not able to share personal information with other electronic devices.

In the example shown in FIG. 1b, two personal information sharing messages are sent from applications 140 to controlling module 130 via API 131. The personal information sharing messages are, for example, update messages sent from a social networking application about the current status of portable electronic device 100. First personal information sharing messages 132 indicates, for example, that portable electronic device 100 has been placed into a silent mode, indicating to interested parties that the user of portable electronic device 100 is not to be disturbed. Second personal information sharing message 133 indicates, for example, that portable electronic device 100 has been placed into a low-power mode, indicating to interested parties that the user of portable electronic device 100 is turning off their portable electronic device. Such exemplary personal information messages could describe a sequence of events where, for example, a user of portable electronic device 100 arrives home from work, turns the ringer on their device off and at a later time turns their device off when they go to sleep.

According to the example shown in FIG. 1b, first personal information sharing message 132 is sent from applications 140 to controlling module 130 via API 131 while the current sharing mode of portable electronic device 100 is set to full sharing mode. As shown in FIG. 1b, controlling module 130 does not filter first personal information sharing message 132. Controlling module 130 passes first personal information sharing message 132 (as message 132') to communication mechanism 150 so that first personal information sharing message 132 can be transmitted to another electronic device (as message 132").

According to the example shown in FIG. 1b, second personal information sharing message 133 is sent from applications 140 to controlling module 130 via API 131 after the current sharing mode of portable electronic device 100 has been changed to full privacy mode. As shown in FIG. 1b, controlling module 130 filters second personal information sharing message 133 and does not pass it along for transmission by communication mechanism 150.

Figure 1C:
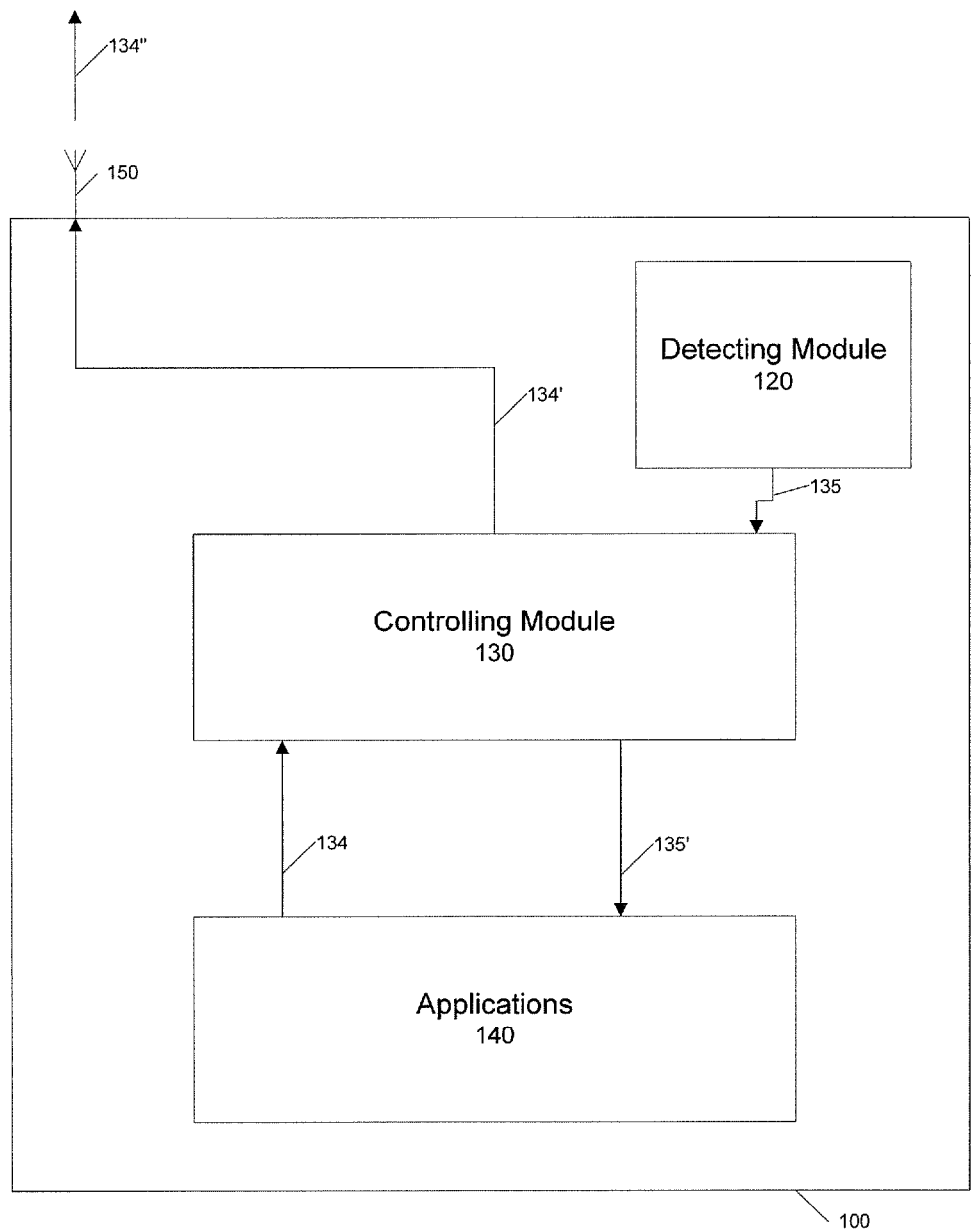
FIG. 1c shows another exemplary portable electronic device for controlled sharing of personal information.

In a second exemplary method, as shown in FIG. 1c, controlling module 130 operates to notify applications 140 about switches to the current level of personal information sharing. Controlling module 130 notifies applications 140 of detected changes to the current sharing mode so that applications 140 behave according to the current sharing mode by only sending requests to controlling module 130 which are commensurate with the current level of personal information sharing.

In the example shown in FIG. 1c, personal information sharing message 134 is sent from applications 140 to controlling module 130. Personal information sharing message 134 is, for example, an update message sent from a shopping application regarding a recent internet search performed at portable electronic device 100. Personal information sharing message 134 includes, for example, information indicating that a user of portable electronic device 100 has searched for restaurants in New York City using an internet browser application executing at portable electronic device 100.

According to the example shown in FIG. 1c, personal information sharing message 134 is sent from applications 140 to controlling module 130 while the current sharing mode of portable electronic device 100 is set to full sharing mode. As shown in FIG. 1c, controlling module 130 does not filter personal information sharing message 134. Controlling module 130 passes personal information sharing message 134 (as message 134') to communication mechanism 150 so that personal information sharing message 134 can be transmitted to another electronic device (as message 134").

According to the example shown in FIG. 1c, at some time after personal information sharing message 134 has been sent by applications 140, detecting module 120 detects a request to alter the sharing mode of portable electronic device 100 to a full privacy mode. Pursuant to detecting module 120 detecting the request, controlling module is notified of the request to enter full privacy mode via message 135. After receiving message 135, controlling module 130 notifies each of the applications of applications 140 of the change to full privacy mode via message(s) 135'. Upon receipt of message(s) 135', applications 140 suppress any personal information sharing messages which would have been sent if portable electronic device 100 were operating according to a full sharing mode.

Figure 1D:
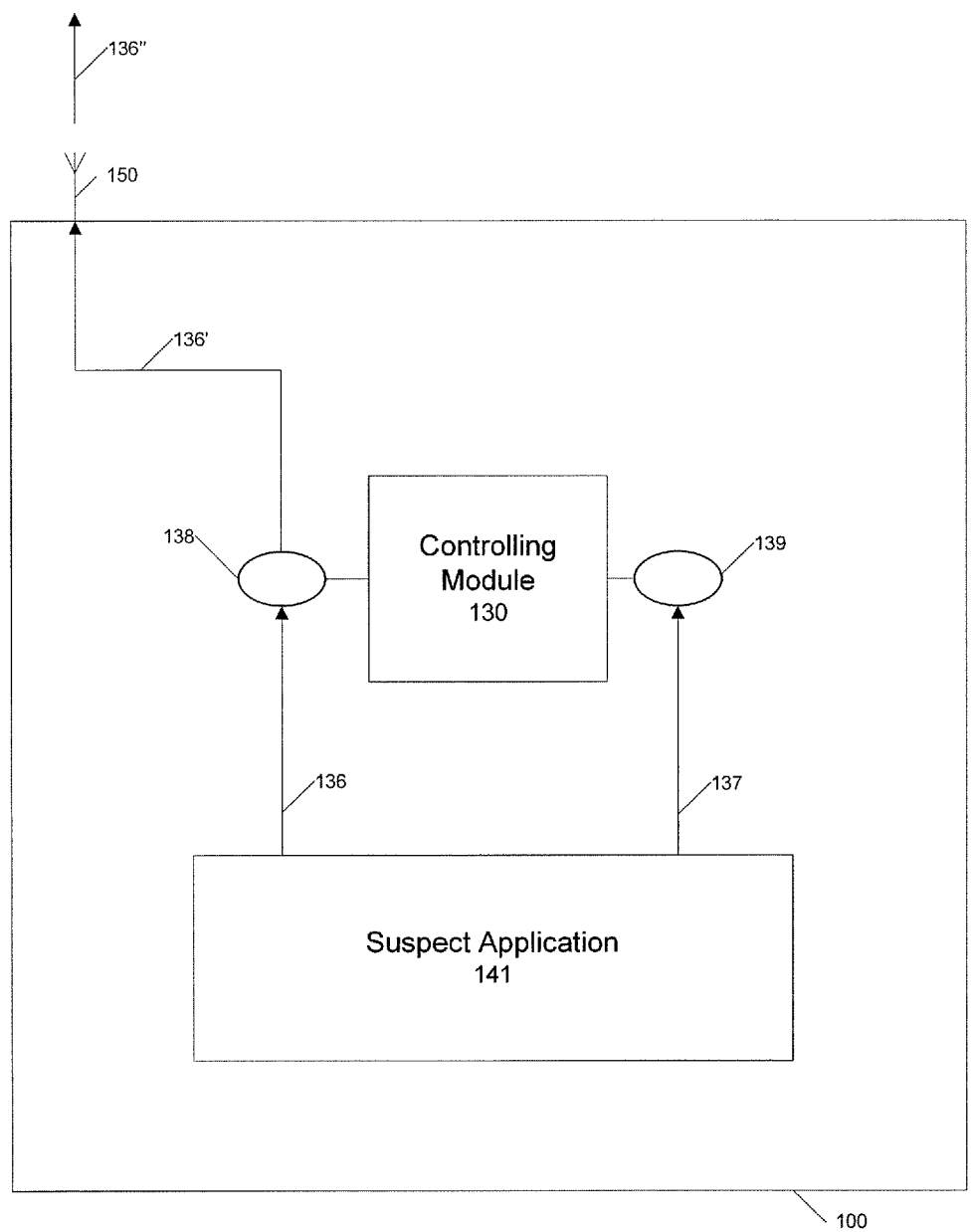
FIG. 1d shows another exemplary portable electronic device for controlled sharing of personal information.

In a third exemplary method, as shown in FIG. 1d, applications 140 include an unknown, non-registered or non-authorized (i.e. suspect) application 141 which is executing at portable electronic device 100. Suspect application 141 includes applications that are not designed to cooperate with controlling module 130 and which do not respond to, or behave according to, messages to and from controlling module 130 (as depicted in FIGS. 1b and 1c). According to the example shown in FIG. 1d, controlling module 130 identifies any suspect applications 141, by, for example, scanning a list of applications executing at portable electronic device 100. If the scanning identifies any suspect applications 141, controlling module 130 may actively monitor messages originating from the suspect applications 141 for transmission via communication mechanism 150. Monitoring messages comprises intercepting and inspecting messages originating from suspect applications 141 before they are sent to other electronic devices by communication mechanism 150. In some embodiments, during inspection, controlling module 130 is able to intercept and discard messages which are identified as personal information messages.

As shown in FIG. 1d, suspect application 141 sends two potential personal information sharing messages, both sent while portable electronic device 100 is operating in a full privacy mode.

As shown in FIG. 1d, first potential personal information sharing message 136 is intercepted by controlling module 130 at inspection 138. During inspection 138, controlling module 130 determines that first potential information sharing message 136 is not a personal information sharing message. Controlling module 130 passes first potential information sharing message 136 along (as message 136') for transmission by communication mechanism 150 as message 136".

As shown in FIG. 1d, second potential personal information sharing message 137 is intercepted by controlling module 130 at inspection 139. During inspection 139, controlling module 130 determines that second potential information sharing message 137 is a personal information sharing message. Controlling module 130 discards or blocks second potential information sharing message 137 to ensure that second potential information sharing message 137 is not transmitted to other electronic devices by communication mechanism 150 according to the full privacy mode.

According to the third exemplary method, controlling module 130 may prompt a user of portable electronic device 100 for permission to send intercepted messages, controlling module 130 may allow the user to establish rules for handling intercepted messages or controlling module 130 may provide an indication, as described in further detail below in relation to FIG. 3, that controlling module 130 may not be capable of ensuring that personal information is being shared according to the current sharing mode.

In a fourth exemplary method controlling module 130 requires applications 140 to be registered or authorized before they are able to be installed or execute at portable electronic device 100. Registration and authorization are accomplished according to well known registration or authorization methods, and ensure that applications 140 are compliant with the controlled sharing of personal information. Such registration or authorization may include testing of personal information sharing functionality to ensure that applications 140 comply with sharing mode specifications. Such registration or authorization may also include other methods of verifying that applications 140 will only share personal information in accordance with the current sharing mode and can include source code inspections, code signing or other methods which accomplish this goal.

As shown in FIGS. 1, 1a, 1b, 1c and 1d, portable electronic device 100 is capable of sharing personal information with other electronic devices using communication mechanism 150. The level of personal information which is shared is controlled by controlling module 130 according to sharing modes. Controlling module 130 determines a desired sharing mode through requests from detecting module 120. Upon receiving, from detecting module 120, a request to alter the sharing mode, controlling module 130 restricts or increases the level of personal information being shared by applications 140 according to the requested sharing mode. Portable electronic device 100 is, accordingly, capable of providing controlled sharing of personal information.

Figure 2:
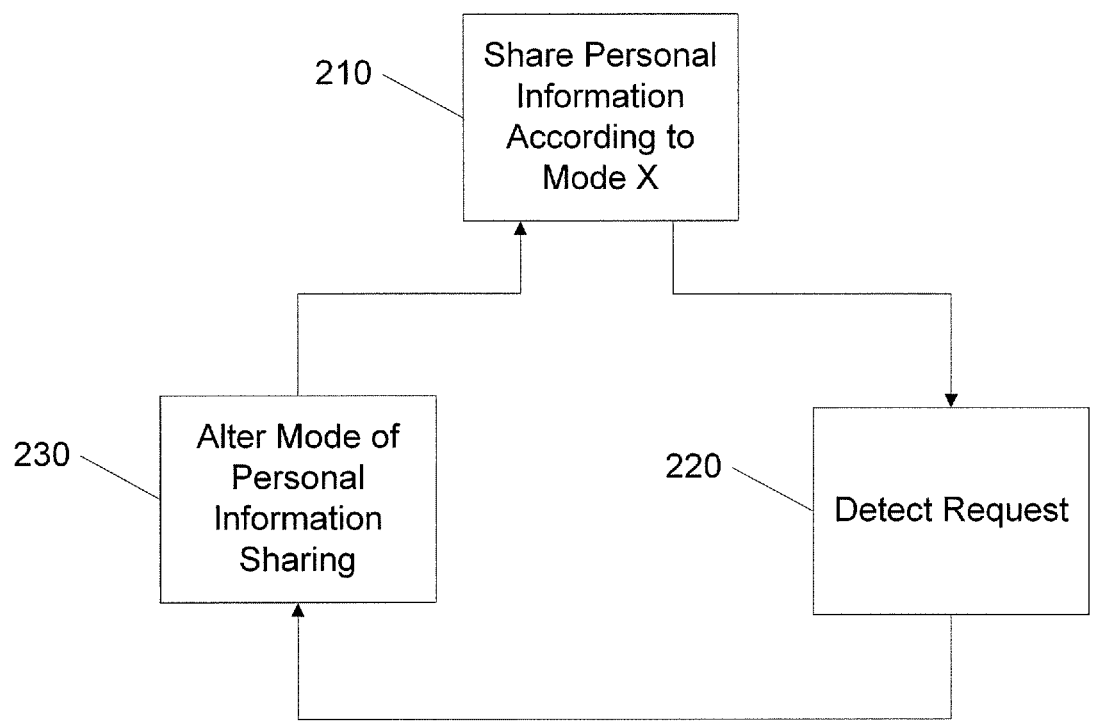
FIG. 2 is a flowchart showing an exemplary method for controlled sharing of personal information.

Turning to FIG. 2, an exemplary method of controlling the sharing of personal information is provided. FIG. 2 describes a method having three steps which cooperate to enable controlled sharing of personal information. The method of FIG. 2 is, for example, carried out at a portable electronic device such as portable electronic device 100.

During step 210, personal information is being shared at a specified sharing mode. For example, personal information may be shared according to a full sharing mode, wherein any and all personal information may be shared.

During step 220, a request to alter the sharing mode is detected. For example, a request may be detected indicating that personal information should be shared according to a full privacy mode, wherein no personal information may be shared.

During step 230, the sharing mode of step 210 is altered to correspond to the request detected during step 220. For example, the sharing mode is altered from full sharing mode to full privacy.

Subsequent to altering the sharing mode in step 230, step 210 is resumed. Step 210 is resumed with an altered sharing mode according to the request detected in step 220 and the alteration made during step 230.

Figure 3:
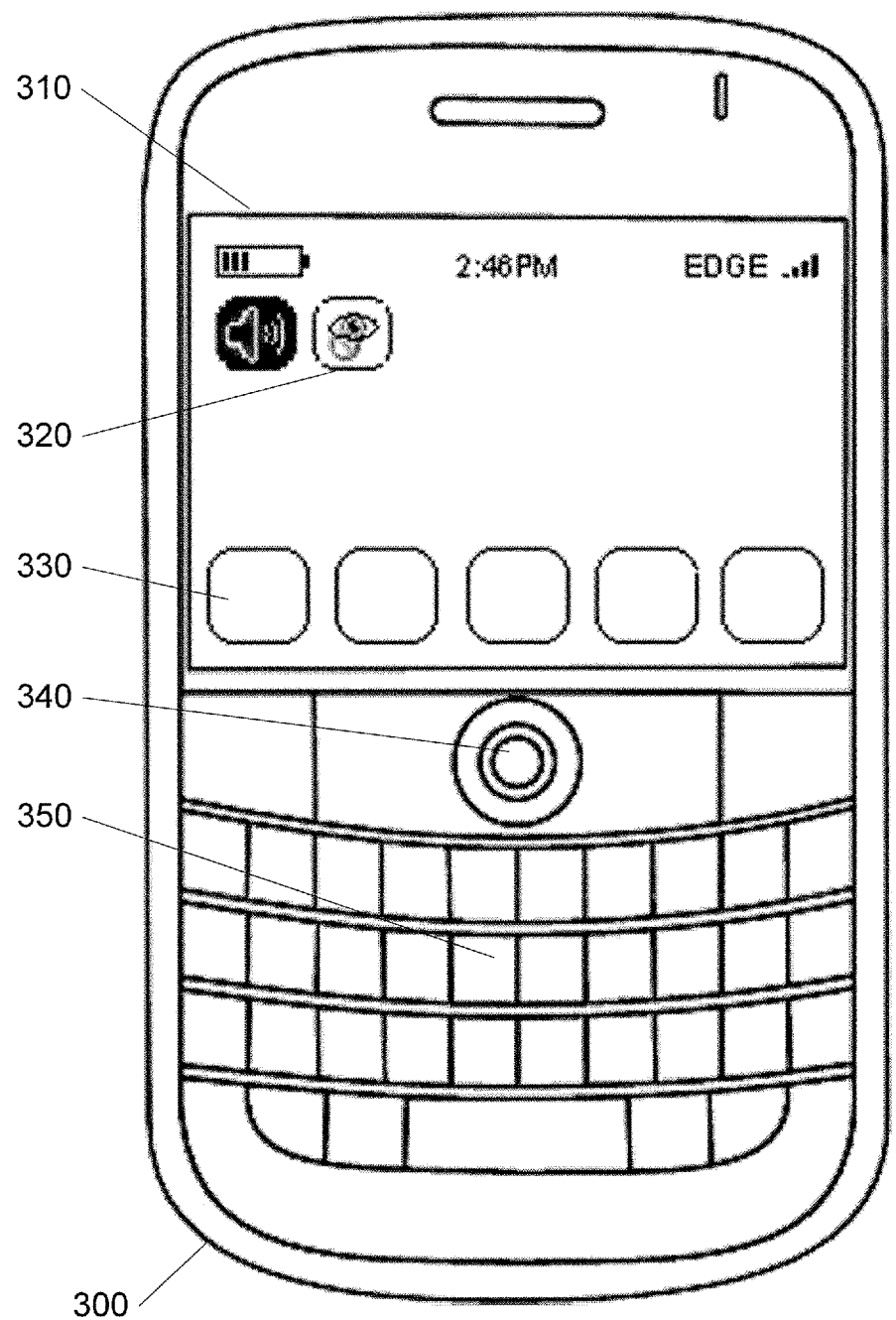
FIG. 3 shows a first exemplary user interface of a portable electronic device for controlled sharing of personal information.

Turning to FIG. 3, a first exemplary user interface of a portable electronic device 300 for controlled sharing of personal information is shown. Portable electronic device 300, generally defined by its housing 300, has user interface elements comprising display 310, keyboard 350 and navigation device 340. Display 310 operates to display graphical user interface elements and in some embodiments is operable to receive user input via touch detection. Keyboard 350 operates to receive user input relative to an indicia associated with each key of keyboard 350. Navigation device 340 operates to provide a user with directional navigation capabilities such that the user is capable of manipulating and interacting with images displayed on display 310. Navigation device 340 also operates to provide a user an ability to actuate elements displayed on display 310, by, for example, clicking navigation device 340. The user interface elements of portable electronic device 300 are well known in the art and variations of any of display 310, keyboard 350 and navigation device 340 are capable of embodying controlled sharing of personal information in accordance with the present technology.

Display 310 shows a number of graphical user interface elements which cooperate to provide controlled sharing of personal information. The user interface elements displayed on display 310 represent a common homescreen used on a portable electronic device. A homescreen is a state of a portable electronic device wherefrom many functional elements, such as application icon 330 can be accessed. A homescreen is a default state which a portable electronic device is usually set to when the portable electronic device is not being used for a particular task, but is awaiting user input to perform a specific operation. A homescreen is sometimes referred to as a homepage, a default screen, a start page, a dashboard or as a desktop.

Application icon 330 is an icon which provides a user of portable electronic device 300 access to an underlying application, such as a location application, a social networking application or a messaging application. Upon detecting an actuation of application icon 330, portable electronic device 300 commences or activates the application associated with application icon 330. Application icons 330 and their operation are well known in the art.

A personal information sharing mode indicator is shown in the form of an icon 320 which provides a user with an indication of the sharing mode at which personal information is presently being shared by portable electronic device 300. In the embodiment shown in FIG. 3, personal information sharing icon 320 includes a graphical indicator which indicates that personal information is not being shared. Personal information sharing icon 320 comprises a sharing indicator and provides an easily referenced indicator to a user of portable electronic device 300 of whether personal information is presently being shared by the device.

Personal information sharing icon 320 is further operable to provide functionality similar to application icon 330. Upon actuation of personal information sharing icon 320, portable electronic device 300 presents a user with a graphical representation of a sharing toggle which allows a user of portable electronic device 300 to alter the sharing mode of portable electronic device 300. An actuation of personal information sharing icon 320 occurs when, for example, a user of portable electronic device 300 navigates a cursor (not shown) onto personal information sharing icon 320 using, for example, navigation device 340 and the user subsequently 'clicks' navigation device 340 to indicate an actuation of personal information sharing icon 320.

FIG. 3 shows personal information sharing icon 320 indicating that personal information is not being shared. According to an apparatus capable of controlled sharing of personal information, the visual representation of personal information sharing icon 320 is changed according to the sharing mode of portable electronic device 300. One exemplary image is shown in FIG. 3, but it is to be understood that any image or visual element which provides an understanding of the current level of personal information being shared by portable electronic device 300 is suitable. As a user of portable electronic device 300 alters the sharing mode of portable electronic device 300 according to the method of FIG. 2, the image shown in personal information sharing icon 320 is updated. The image of personal information sharing icon 320 reflects the current mode of sharing of portable electronic device 300 and could include any visual elements which convey an appropriate meaning to a user.

One example of appropriate visual elements includes a set of progressively incremented bars, with a larger set of bars indicating a higher level of personal information sharing. Another example includes a colour indication set, with, for example, a green indication meaning full privacy mode or full sharing mode and a red indication meaning the other of the two modes. In such a colour based system, a variety of other colours (such as yellow and orange) indicate distinct sharing modes along the gradient of modes from full sharing mode to full privacy mode. Other appropriate visual elements are possible. Any visual element capable of conveying the various sharing modes to a user is contemplated as being included as embodiments of a system and method for controlled sharing of personal information.

According to some embodiments, as described above in relation to FIG. 1, personal information sharing icon 320 may include an indication that personal information may not be being shared according to the current sharing mode. Such an indication may include an alerting visual indication, such as an exclamation mark or a 'black eye', indicating to the user that there is the potential that an undesired level of personal information may be being shared.

Figure 4:
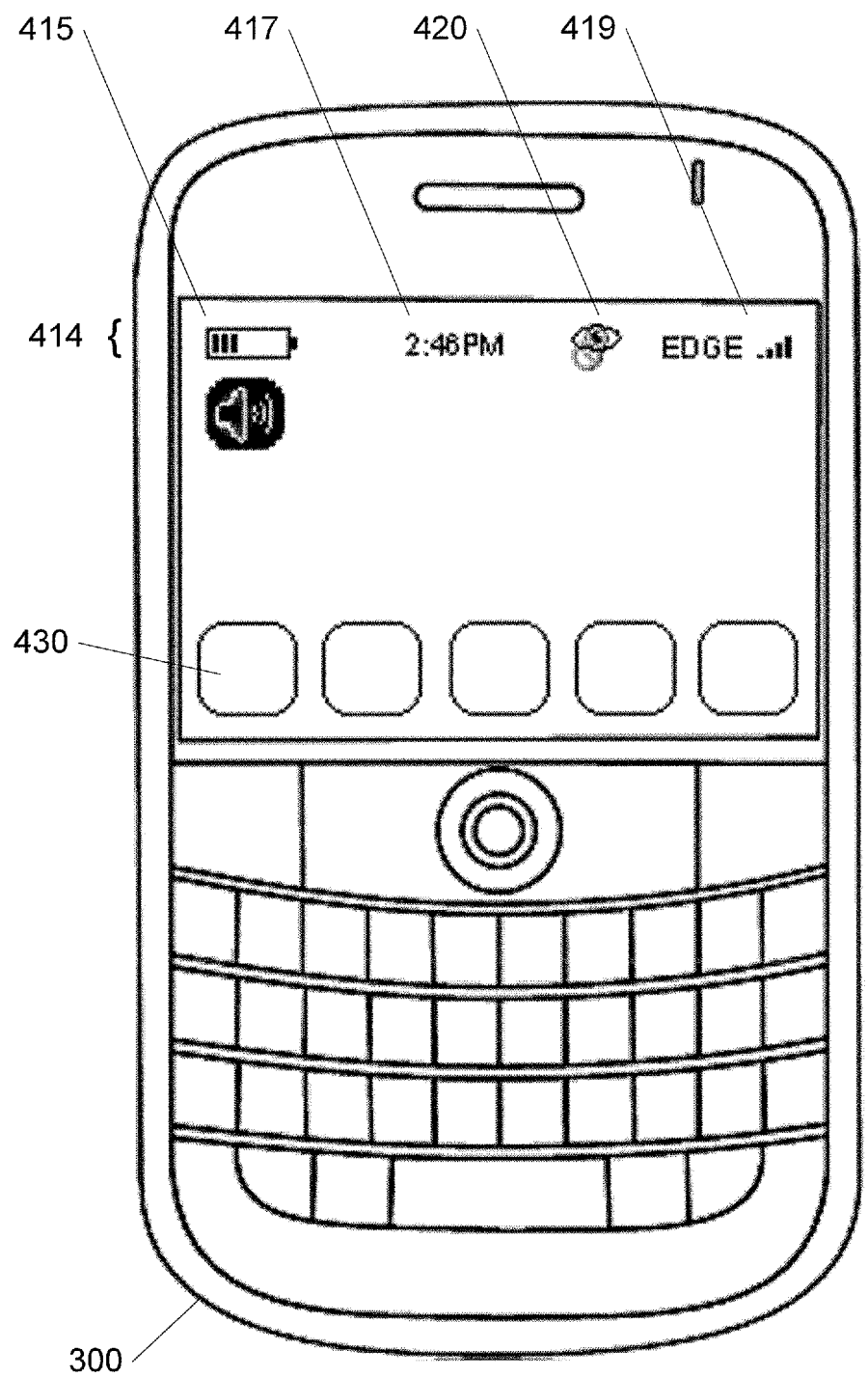
FIG. 4 shows a second exemplary user interface of a portable electronic device for controlled sharing of personal information.

Turning to FIG. 4, exemplary portable electronic device 300 of FIG. 3 is shown again comprising a second exemplary user interface for controlled sharing of personal information. FIG. 4 comprises four indicators, including battery indicator 415, time indicator 417, network connectivity indicator 419 and personal information sharing mode indicator 420 which together comprise status bar 414. Status bar 414 is a user interface element which is present during most operations of portable electronic device 300 as is well known.

Personal information sharing mode indicator 420 provides a graphical representation of the current sharing mode being performed at portable electronic device 300. The graphical representation is changed as the sharing mode is changed according to the method described in FIG. 2. When the sharing mode is changed, the appearance of personal information sharing mode indicator 420 is altered according to provide a graphical indication of the new sharing mode. An image which represents no sharing of personal information (i.e. full privacy mode) is displayed as personal information sharing mode indicator 420 in FIG. 4.

Figure 5:
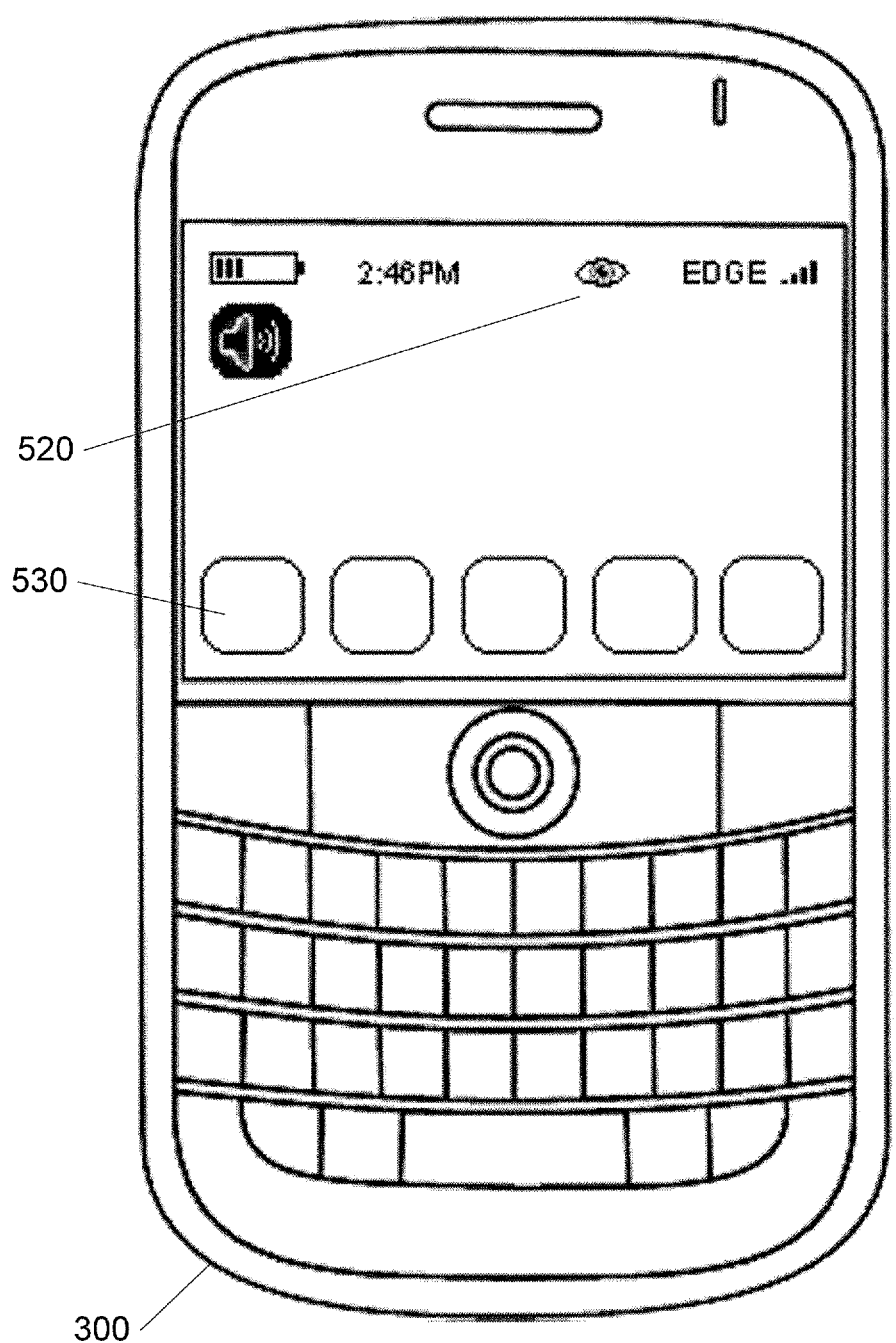
FIG. 5 shows a third exemplary user interface of a portable electronic device for controlled sharing of personal information.

Turning to FIG. 5, exemplary portable electronic device 300 of FIG. 3 is shown again comprising a third exemplary user interface for controlled sharing of personal information.

FIG. 5 comprises personal information sharing mode indicator 520 which provides a graphical representation of the current sharing mode of portable electronic device 300. The graphical representation is changed according to the method described in FIG. 2. When the sharing mode is changed, the image of personal information sharing mode indicator 520 is altered according to the new sharing mode. An image which represents full sharing of personal information (i.e. full sharing mode) is displayed as personal information sharing mode indicator 520 in FIG. 5.

Figure 6:
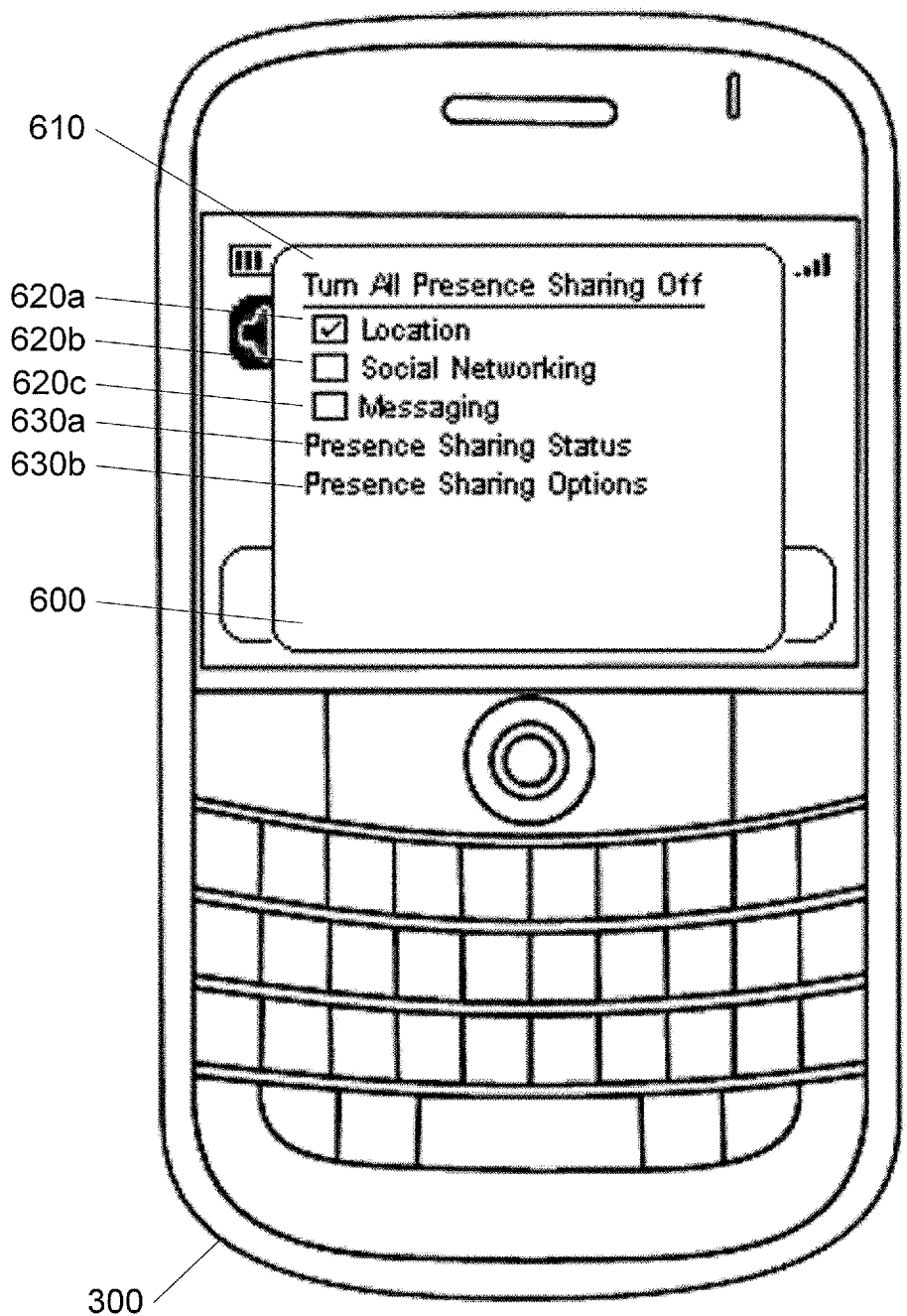
FIG. 6 shows a fourth exemplary user interface of a portable electronic device for controlled sharing of personal information.

Turning to FIG. 6, exemplary portable electronic device 300 of FIG. 3 is shown again comprising a fourth exemplary user interface for controlled sharing of personal information.

FIG. 6 comprises an exemplary sharing toggle 600 which provides a single point of access from which a user of portable electronic device 300 can alter the level of sharing of personal information across all applications of the device. Sharing toggle 600 provides a streamlined mechanism for controlling the sharing of any and all personal information by portable electronic device 300 and is accessible via, for example, personal information sharing icon 320 of FIG. 3 or any other commonly known mechanism for accessing applications on a portable electronic device, such as a hotkey, a convenience key or a menu option and the like.

Sharing toggle 600 comprises a universal sharing toggle 610 which is capable of turning off all presence sharing upon being actuated by, for example, a user navigating a cursor of portable electronic device 300 onto universal sharing toggle 610 and actuating an input mechanism of portable electronic device 300. Upon actuation of universal sharing toggle 610, in the example displayed in FIG. 6, all personal information sharing at portable electronic device 300 is restricted, effectively placing portable electronic device 300 in full privacy mode. Using the example of FIGS. 1 and 2, an actuation of universal sharing toggle 610 initiates a request to alter the sharing mode which is detected by detecting module 120. Detecting module 120 passes the request to controlling module 130 which initiates and imposes a full privacy mode, for example, according to one of the methods shown in FIGS. 1b, 1c and 1d.

Sharing toggle 600 further comprises individual sharing toggles 620 which indicate the status of personal information sharing for a single application of portable electronic device 300. In the example of FIG. 6, individual sharing toggle 620a indicates that a location application is sharing personal information, individual sharing toggle 620b indicates that a social messaging application (or group of social messaging applications) is not sharing personal information and individual sharing toggle 620c indicates that a messaging application is also not sharing personal information.

An actuation of any of individual sharing toggles 620 initiates a restriction (or loosening) of the respective application's continued sharing of personal information. In the example of FIG. 6, a first actuation of individual sharing toggle 620a initiates a restriction of personal information sharing permitted by a location application. Similarly, a first actuation of individual sharing toggle 620b initiates an enabling of personal information sharing by a social networking application (or group of social networking applications). Detecting module 120 is configured to detect actuations of individual sharing toggles 620 and pass appropriate messages to controlling module 130 which will initiate and impose a sharing mode according to the requested restriction or enabling of sharing of individual applications.

It is understood that more or fewer individual sharing toggles may be present in sharing toggle 600 depending on the specific applications of portable electronic device 300. In some embodiments, groups of applications having a common functionality (such as a group of social networking applications) are included as a single individual sharing toggle.

Sharing toggle 600 further includes additional access points 630 which provide access to additional information and options relevant to the sharing of personal information.

Additional access point 630a provides access to a user interface element which provides detailed information about the current status of personal information sharing.

Additional access point 630b provides access to a user interface which permits the modification of options relevant to the sharing of personal information. Such options include the ability to establish automated toggling of personal information sharing according to a schedule or other criteria, such as toggling the sharing mode in step with changes to a notification profile or a sharing profile and the like, the ability to alter the granularity (or level of detail) of shared personal information and the like, to define types, classes and amounts and levels of personal information shared at any given sharing mode and to define new sharing modes and modify existing sharing modes as well as to create, modify and delete privacy profiles.

A privacy profile is associated with a sharing mode and allows a user of portable electronic device 300 to define certain categories of personal information sharing. For example, a user might create a first privacy profile called 'At Home' and a second privacy profile called 'At Work'. A portable electronic device operating according to the 'At Home' privacy profile might not share any personal information about location, but might share personal information about messaging, for example. Similarly, a portable electronic device operating according to an 'At Work' privacy profile might share personal information related to a location application and a calendar application but might not share personal information related to a social networking application. A user is able to alternate between various privacy profiles using well known techniques similar to techniques used for alternating amongst notification profiles.

Figure 7:
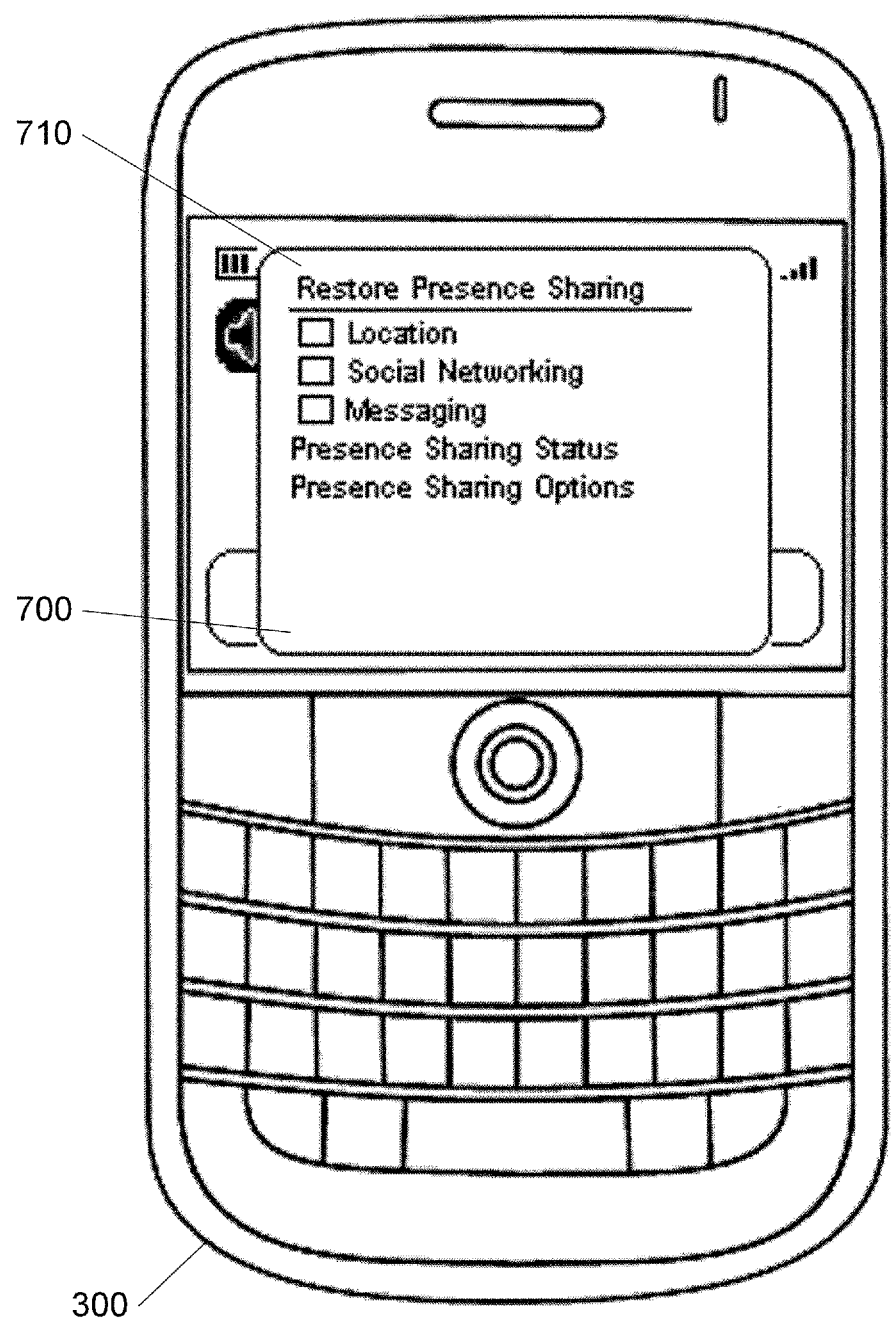
FIG. 7 shows a fifth exemplary user interface of a portable electronic device for controlled sharing of personal information.

Turning to FIG. 7, exemplary portable electronic device 300 of FIG. 3 is shown again comprising a fifth exemplary user interface for controlled sharing of personal information.

FIG. 7 shows sharing toggle 700 which comprises a universal sharing toggle 710 which is capable of restoring a previous sharing mode upon being actuated by, for example, a user navigating a cursor of portable electronic device 300 onto universal sharing toggle 710 and actuating an input mechanism of portable electronic device 300. Upon actuation of universal sharing toggle 710, in the example displayed in FIG. 7, all personal information sharing at portable electronic device 300 is restored to a previous sharing mode. Universal sharing toggle 710 alters the sharing mode of portable electronic device 300 to place it in the sharing mode which portable electronic device 300 was in prior to an actuation of a universal sharing toggle 610 (of FIG. 6) which placed portable electronic device 300 in full privacy mode.

Figure 8:
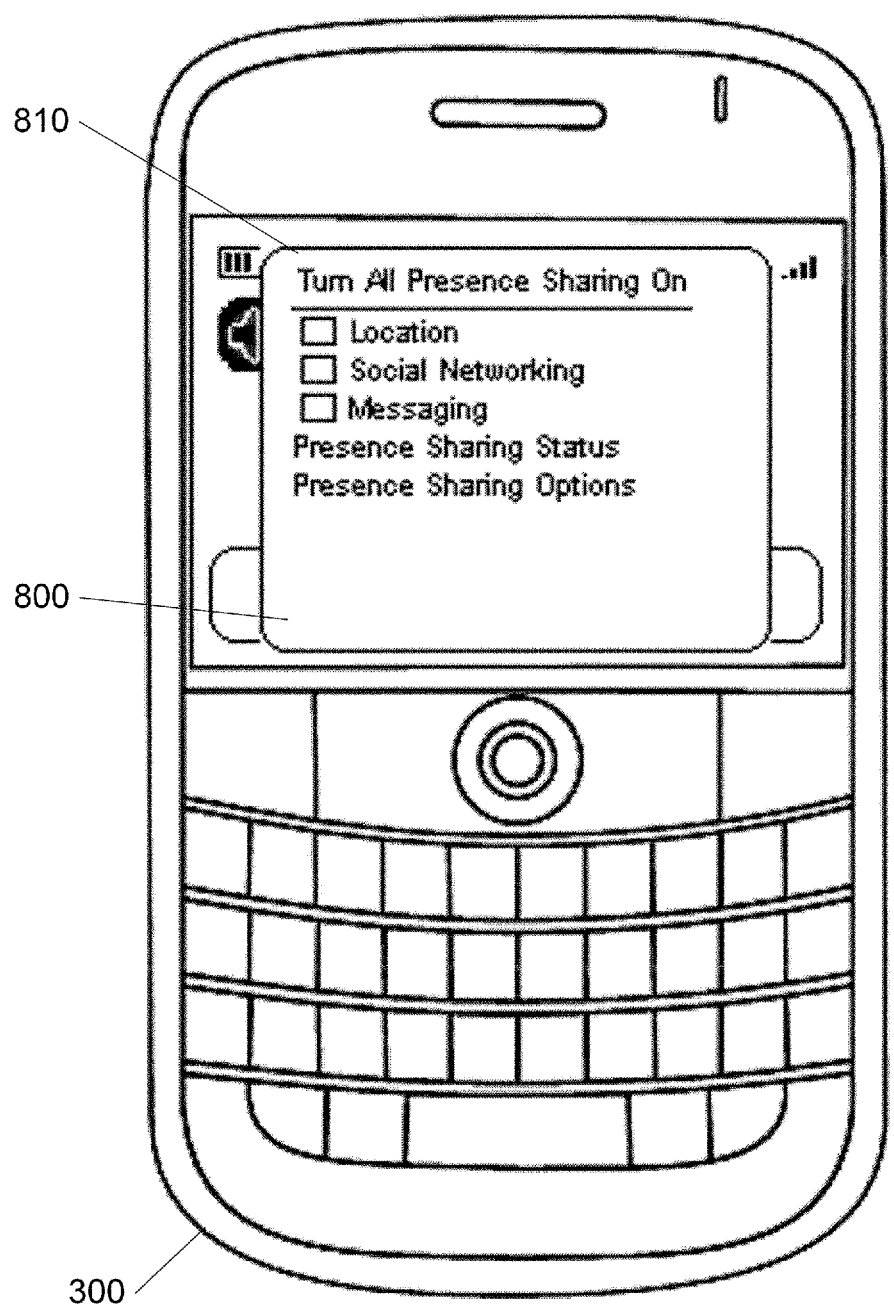
FIG. 8 shows a sixth exemplary user interface of a portable electronic device for controlled sharing of personal information.

Turning to FIG. 8, exemplary portable electronic device 300 of FIG. 3 is shown again comprising a sixth exemplary user interface for controlled sharing of personal information.

FIG. 8 shows sharing toggle 800 which comprises a universal sharing toggle 810 which initiates a 'turning on' of personal information sharing at all relevant source applications of portable electronic device 300. An actuation of universal sharing toggle 810 places portable electronic device 300 in a full sharing mode. Using the example of FIGS. 1 and 2, an actuation of universal sharing toggle 810 initiates a request to alter the sharing mode which is detected by detecting module 120. Detecting module 120 passes the request to controlling module 130 which initiates and imposes a full sharing mode, for example, according to one of the methods shown in FIGS. 1b, 1c and 1d.

The foregoing examples describe embodiments of controlled personal information sharing wherein detecting module 120 and controlling module 130 execute at portable electronic device 100. A skilled reader will understand that detecting module 120 and controlling module 130 are also capable of operating remote from portable electronic device 100, such as at server 183. According to such an embodiment, server 183 is configured to receive and filter or not filter personal information sharing messages upon receipt of personal information sharing messages from portable electronic device 100 according to a desired sharing mode. In such an embodiment, server 183 filters personal information sharing messages by not forwarding the messages on to other electronic devices.

The foregoing examples are meant to provide a skilled reader with the detailed information required to practice an improved system and method improved personal information publication. The improved system and method are, by no means, limited in scope to the presented embodiments, but are defined by the claims attached hereto.

What is claimed is:

1. An apparatus for controlled sharing of personal information, the apparatus being operable in a plurality of information sharing modes, the apparatus comprising:
 a plurality of applications each independently operable to share personal information with other devices according to the information sharing modes;
 a memory; and a processor coupled to the memory and operable to execute computer executable instructions to:

detect a request on the device to alter the information sharing mode; and alter the information sharing mode in response to the detected request by notifying the plurality of applications of the detected request and controlling the ability of the plurality of applications to share personal information according to the requested information sharing mode, the altering comprising ensuring the plurality of applications share personal information according to the requested information sharing mode.

2. The apparatus of claim 1 wherein altering the information sharing mode comprises restricting the level of personal information being shared by the plurality of applications.

3. The apparatus of claim 1, the processor being further operable to display an indicator which indicates the information sharing mode.

4. The apparatus of claim 3 wherein the indicator is displayed as part of a homescreen.

5. The apparatus of claim 3 wherein the indicator is displayed as part of a status bar.

6. A method to control sharing of personal information from a portable electronic device to other devices, the method comprising:

operating the portable electronic device in a plurality of information sharing modes, the portable electronic device comprising a plurality of applications each independently operable to share personal information with the other devices according to the information sharing modes;

detecting a request on the device to alter information sharing mode; and altering the information sharing mode in response to the detected request by notifying the plurality of applications of the detected request and controlling the ability of the plurality of applications to share personal information according to the requested information sharing mode, the altering comprising ensuring the plurality of applications share personal information according to the requested information sharing mode.

7. The method of claim 6 wherein the altering comprises filtering requests to share personal information received according to an Application Programming Interface.

8. The method of claim 6 wherein the altering further comprises:

identifying one or more suspect applications; and inspecting requests to share personal information originating from the one or more suspect applications.

9. The method of claim 6 wherein the detecting and altering occur at a portable electronic device.

10. The method of claim 6 wherein the detecting and altering occur at a server.

11. A non-transitory computer readable medium comprising computer executable instructions to control sharing of personal information from a portable electronic device to other devices, the portable electronic device being operable in a plurality of information sharing modes and comprising a plurality of applications each independently operable to share personal information with the other devices according to the information sharing modes, the computer executable instructions comprising instructions for:

detecting a request on the device to alter the information sharing; and altering the information sharing mode in response to the detected request by notifying the plurality of applications of the detected request and controlling the ability of the plurality of applications to share personal information according to the requested information sharing, the altering comprising ensuring the plurality of applications share personal information according to the requested information sharing mode.

12. The apparatus of claim 1, wherein altering the level of personal information being shared comprises filtering requests to share personal information received according to an Application Programming Interface.

13. The apparatus of claim 1 wherein the processor is further operable to:

identify one or more suspect applications; and inspect requests to share personal information originating from the one or more suspect applications.

14. The apparatus of claim 1 being a portable electronic device.

15. The apparatus of claim 1 being a server.

16. The apparatus of claim 1, the processor being further operable to display an indicator which indicates the information sharing mode.

17. The apparatus of claim 16, wherein the indicator is displayed as part of a homescreen.

18. The apparatus of claim 16, wherein the indicator is an icon and upon an actuation of the icon a graphical representation of a sharing toggle is displayed.

19. The apparatus of claim 18 wherein the sharing toggle comprises:

a universal sharing toggle; and an individual sharing toggle.

20. The apparatus of claim 19 wherein the sharing toggle further comprises an additional access point.

21. The apparatus of claim 16, wherein the indicator comprises an alerting visual indication which indicates that there is a potential that an undesired level of personal information may be being shared by the plurality of applications.

22. The method of claim 6 further comprising restricting a level of personal information being shared by the plurality of applications.

23. The method of claim 6, further comprising displaying an indicator which indicates the information sharing mode.

24. The method of claim 23, wherein the indicator is displayed as part of a homescreen.

25. The method of claim 23, wherein the indicator is displayed as part of a status bar.

26. The method of claim 23, wherein the indicator is an icon, the method further comprising:

detecting actuation of the icon; and displaying a graphical representation of a sharing toggle upon detecting the actuation of the icon.

27. The method of claim 26 wherein the sharing toggle comprises:

a universal sharing toggle; and an individual sharing toggle.

28. The method of claim 27 wherein the sharing toggle further comprises an additional access point.

29. The method of claim 23, wherein the indicator comprises an alerting visual indication which indicates that there is a potential that an undesired level of personal information may be being shared by the plurality of applications.

* * * * *